UNITED STATES PATENT OFFICE.

CHARLES S. KINNISON, OF BIRMINGHAM, MICHIGAN.

PROCESS OF BONDING KIESELGUHR POWDER AND PRODUCT THEREOF.

1,259,525. Specification of Letters Patent. Patented Mar. 19, 1918.

No Drawing. Application filed June 27, 1917. Serial No. 177,295.

*To all whom it may concern:*

Be it known that I, CHARLES S. KINNISON, citizen of the United States, residing at Birmingham, county of Oakland, State of Michigan, have invented a certain new and useful Improvement in Processes of Bonding Kieselguhr Powders and Products Thereof, and declare the following to be a full, clear, and exact description of the same, such as will enable others skilled in the art to which it pertains to make and use the same.

This invention relates to a process of bonding kieselguhr powder and also to the product.

Kieselguhr is found in nature in a stratified state and in this state has a certain tendency to exist in the form of a coherent mass, but the cohesion is weak. However, the natural deposits of kieselguhr are worked and a great deal of the kieselguhr that is used in commerce is produced by sawing out blocks. There are also some other ways of making available the kieselguhr, such as bonding it by mixing it with other substances and burning the mixture.

My discovery comprises a process for bonding finely divided kieselguhr or kieselguhr powder so that same may be molded in any desired shape. It not only makes kieselguhr in body form available at much less cost but it makes possible the use of kieselguhr in shapes, which under the present methods would not be really commercially practical. The final product also is a great improvement in the way of economy in shipping, handling, etc., as it allows the transportation of the kieselguhr in the form of powder to places where it can be molded into bricks or other shapes.

The process part of my discovery consists in adding to the kieselguhr in its finely divided state a certain percentage of soda ash or sodium carbonate. The exact percentages of ingredients that go to make up this composition may be varied within fairly wide ranges, but I find that the best results are secured by using from 8 to 15%. of soda ash or sodium carbonate and from 92 to 85% respectively of the kieselguhr. This soda ash or sodium carbonate can be added to the kieselguhr in various ways but I find the best results are secured by introducing the soda ash or sodium carbonate dissolved in water. The exact amount of water is not very material although one should use a suitable percentage of water to give the mixture such working properties as are demanded by the process used in fashioning it into shape, which may be either by the so-called dry press process or by molding it using a softer consistency. When the substances that have been added together, namely, the kieselguhr, soda ash and water, are dried so that the water is driven out, the soda ash acts to securely bond the particles of kieselguhr together so that they have a body of considerable strength. It will also be found in bodies molded of this composition the bonding is stronger on the exposed surfaces due to the concentration of the bonding agent near the surface during the process of evaporation.

This process results in a composition of matter which I believe is entirely new. It is my present information and theory that a true chemical combination takes place between the kieselguhr particles and the sodium carbonate. Sodium carbonate is ordinarily expressed in the formula $Na_2CO_3$. Kieselguhr will be found to be made up largely of silica, which is $SiO_2$. Water, of course, is $H_2O$. The combination of the various ingredients may be expressed by the approximate chemical equation of:

$$Na_2CO_3 + H_2O + SiO_2 = H_2O + CO_2 + Na_2SiO_3.$$

It is my belief that sodium silicate of some variety is formed as indicated by this equation and that this material acts as the principal bonding agent. It is obvious that the soda ash can combine with only a certain part of the kieselguhr, yet this is sufficient to produce satisfactory mechanical strength.

I am, of course, aware that soda ash is not pure sodium carbonate but in industrial circles soda ash and sodium carbonate are considered for most intents and purposes the same. It is therefore in this sense that sodium carbonate and soda ash are spoken of together in this specification and the claims.

What I claim is:

1. A process of producing a kieselguhr composition, comprising the adding of soda ash to the kieselguhr in the presence of moisture, and drying the same.

2. A process of producing a kieselguhr composition, comprising adding sodium carbonate to the kieselguhr in portions approximating 8 to 15 parts of sodium carbonate and 92 to 85 parts of kieselguhr, moistening the mixed particles, and then drying the same.

3. A process of producing a kieselguhr composition, comprising the combining of finely divided kieselguhr with a solution of sodium carbonate, and then drying the same.

4. A process of producing a kieselguhr composition, consisting of adding to the kieselguhr a solution of sodium carbonate in proportions approximating from 8 to 15 parts of sodium carbonate and 92 to 85 parts of kieselguhr, and then drying the same.

5. A plastic composition consisting of infusorial earth combined with soda ash in proportions of about 8 to 15% of soda ash and 92 to 85% of infusorial earth.

6. A plastic composition consisting of kieselguhr and soda ash in bonded state, the bond comprising portions of the kieselguhr and portions of the sodium carbonate of the soda ash combined to form sodium silicate.

7. A process of producing kieselguhr composition, comprising the adding of sodium carbonate to the kieselguhr in the presence of moisture and then drying the same.

In testimony whereof, I sign this specification.

CHARLES S. KINNISON.